United States Patent
Chan

(10) Patent No.: US 11,620,242 B2
(45) Date of Patent: *Apr. 4, 2023

(54) DETERMINING WRITE COMMANDS FOR DELETION IN A HOST INTERFACE

(71) Applicant: Micron Technology, Inc., Boise, ID (US)

(72) Inventor: Yue Chan, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,176

(22) Filed: Aug. 30, 2021

(65) Prior Publication Data
US 2022/0035754 A1 Feb. 3, 2022

Related U.S. Application Data

(63) Continuation of application No. 16/929,416, filed on Jul. 15, 2020, now Pat. No. 11,113,213.

(60) Provisional application No. 62/954,854, filed on Dec. 30, 2019.

(51) Int. Cl.
*G06F 13/16* (2006.01)
*G06F 11/10* (2006.01)

(52) U.S. Cl.
CPC ...... *G06F 13/1668* (2013.01); *G06F 11/1076* (2013.01)

(58) Field of Classification Search
CPC .......................... G06F 13/1668; G06F 11/1076
See application file for complete search history.

(56) References Cited

U.S. PATENT DOCUMENTS

| 5,388,222 | A | 2/1995 | Chisvin |
| 7,733,879 | B2 | 6/2010 | Herbst |
| 8,239,607 | B2 | 8/2012 | LaBerge |
| 8,634,267 | B2 | 1/2014 | Tam |
| 10,025,517 | B2 * | 7/2018 | Kim .................. G11C 13/0028 |
| 10,043,577 | B2 * | 8/2018 | Shimizu ............. G11C 13/0069 |
| 2006/0129764 | A1 | 6/2006 | Bellows |
| 2011/0072028 | A1 | 3/2011 | Rousseau |
| 2017/0047119 | A1 | 2/2017 | Xu |
| 2017/0052739 | A1 | 2/2017 | Terada |
| 2017/0371787 | A1 | 12/2017 | Kalyanasundharam et al. |
| 2017/0371791 | A1 | 12/2017 | Ranjan |

(Continued)

FOREIGN PATENT DOCUMENTS

| CN | 1851673 A | 10/2006 |
| CN | 101354641 A | 1/2009 |

(Continued)

OTHER PUBLICATIONS

First Office Action from related Chinese patent application No. 202011575263.7, dated Dec. 13, 2021, 19 pages.

*Primary Examiner* — Kyle Vallecillo
(74) *Attorney, Agent, or Firm* — Brooks, Cameron & Huebsch, PLLC

(57) ABSTRACT

An interface of a memory sub-system can determine that a particular write command received from a host has a same address as a subsequently received write command from the host. The interface can delete the particular write command if it is still in the interface or send a signal to delete the particular write command if the write command has already been provided from the interface.

20 Claims, 4 Drawing Sheets

(56) References Cited

U.S. PATENT DOCUMENTS

| | | |
|---|---|---|
| 2018/0189155 A1 | 7/2018 | Gunnam |
| 2018/0307547 A1 | 10/2018 | Jeong |
| 2019/0243548 A1 | 8/2019 | Duncan |
| 2021/0004180 A1 | 1/2021 | Lee |

FOREIGN PATENT DOCUMENTS

| | | |
|---|---|---|
| CN | 109213526 A | 1/2019 |
| JP | 2008009699 A | 1/2008 |

\* cited by examiner

DETERMINING WRITE COMMANDS FOR DELETION IN A HOST INTERFACE

PRIORITY INFORMATION

This application is a Continuation of U.S. application Ser. No. 16/929,416, filed on Jul. 15, 2020, which claims priority to U.S. Provisional Application Ser. No. 62/954,854, filed Dec. 30, 2019, the contents of which are incorporated herein by reference.

TECHNICAL FIELD

Embodiments of the disclosure relate generally to memory sub-systems, and more specifically, relate to determining write commands for deletion in a host interface.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
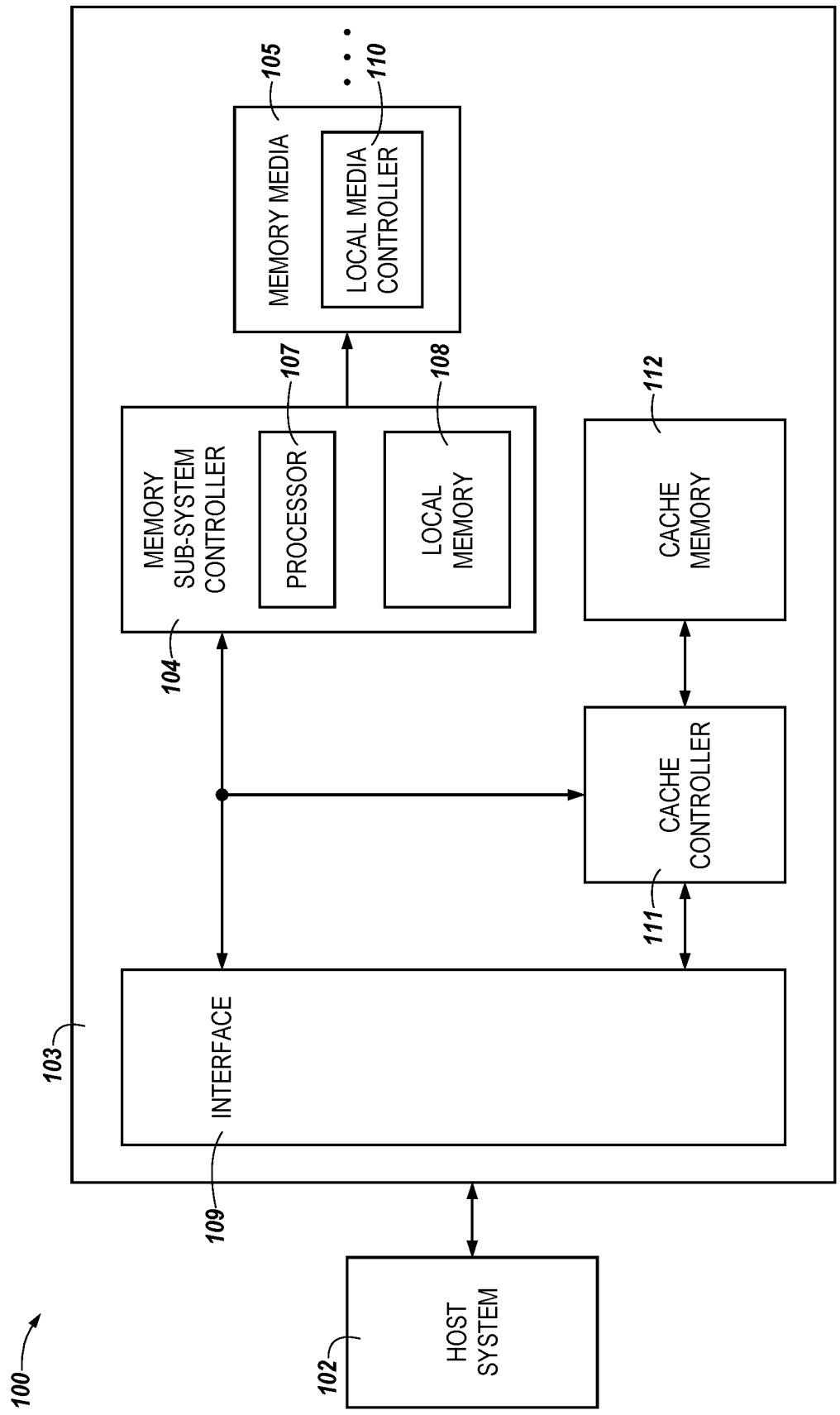
FIG. 1 illustrates an example of a computing system that includes a memory sub-system comprising an interface and a cache controller in accordance with some embodiments of the present disclosure.

Aspects of the present disclosure are directed to memory sub-systems that determine write commands for deletion in a host interface. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory components can include non-volatile memory devices that store data from the host system. A non-volatile memory device is a package of one or more dice. The dice in the packages can be assigned to one or more channels for communicating with a memory sub-system controller. The non-volatile memory devices include cells (i.e., electronic circuits that store information) that are grouped into pages to store bits of data. The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array. A memory sub-system controller can send and receive user data and corresponding metadata as management units to and from memory devices. Another example of a non-volatile memory device is a negative-and (NAND) memory device. With NAND type memory, pages can be grouped to form blocks. Other examples of non-volatile memory devices are described below in conjunction with FIG. 1.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data.

The memory sub-systems can receive multiple write commands to a same address within a short interval of time. In some examples, the memory sub-system can include a cache memory. The cache memory can be controlled by a cache controller. The cache controller can identify the multiple write commands as writing to a same address. The cache controller can merge the multiple write commands to a same address by not executing earlier received write commands and only executing the latest received write command responsive to determining that the write commands write to a same address. However, comparing the write commands to determine if the write commands write to a same address can utilize resources of the cache controller, such as a processing device, such that other commands are not executed by the cache controller in the meantime.

Aspects of the present disclosure address the above and other deficiencies by identifying the write commands as writing to a same address in an interface of the memory sub-system. The interface can identify and mark the write commands utilizing an error circuitry. The interface can mark a write command by adding or modifying metadata associated with the write command. For example, the interface can add a bit to the metadata associated with the write command indicating that the write command has been marked. The error circuitry can provide results of performing an error check and/or marking the write commands to the cache controller. The error check can be performed utilizing an error correction code (ECC), not to the exclusion of other error checks. The error check can determine whether write commands are erroneous. A write command can be erroneous if there is an error in the data corresponding to the write command. An error in the data can include a corruption in the data corresponding to the write command among other possible types of errors. The cache controller can delete the write commands based on receipt of the results of the error check and/or the marked write commands.

Identifying the write commands as writing to a same address, in an interface as compared to in the cache controller can free the cache controller to allow the cache controller to perform other operations. Utilizing the error circuitry to provide the identifications to the cache controller can provide two functions for the same data. For example, the results of the error check can be used to identify data that contains an error and can drop the corresponding commands. The results of the error check can also be used to identify commands that write to a same address and drop at least one of the identified commands. As used herein, dropping one or more write commands (e.g., deleting commands) to an address and executing another write command to the address can also be described as merging the commands. For instance, if a first write command writes to a same address as a second write command, then the first write command and the second write command can be merged by executing the second write command and by not executing the first write command. The commands can be referred to as being merged due to executing the latest command received (e.g., the last write command received) and not the earlier received write commands (e.g., first write commands received) to a same address.

The figures herein follow a numbering convention in which the first digit or digits correspond to the drawing figure number and the remaining digits identify an element or component in the drawing. Similar elements or components between different figures may be identified by the use of similar digits. For example, 109 may reference element "09" in FIG. 1, and a similar element may be referenced as 209 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example of a computing system 100 that includes a memory sub-system 103 in accordance with some embodiments of the present disclosure. The memory sub-system 103 can include media, such as one or more volatile memory devices, one or more non-volatile memory devices, or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 103, for example, to write data to the memory sub-system 103 and read data from the memory sub-system 103.

The host system 102 can be coupled to the memory sub-system 103 via a physical host interface 109. The interface 109 can be internal to the memory sub-system 103. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The interface 109 can be used to transmit commands, addresses, and/or data between the host system 102 and the memory sub-system 103. The host system 102 can further utilize an NVM Express (NVMe) interface to access components (e.g., memory devices 105) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

The memory devices 105, 112 can include any combination of the different types of non-volatile memory devices 105 and/or volatile memory devices 112. The volatile memory devices (e.g., memory device 112) can be, but are not limited to, random access memory (RAM), such as dynamic random access memory (DRAM) and synchronous dynamic random access memory (SDRAM).

Some examples of non-volatile memory devices (e.g., memory device 105) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 105 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 105, 112 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 105, 112 can be grouped as pages that can refer to a logical unit of the memory device used to store data. With some types of memory (e.g., NAND), pages can be grouped to form blocks.

Although non-volatile memory devices 105 such as 3D cross-point array of non-volatile memory cells and NAND type memory (e.g., 2D NAND, 3D NAND) and 3D cross-point array of non-volatile memory cells are described, the memory device 105 can be based on any other type of non-volatile memory or storage device, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory devices 105 to perform operations such as reading data, writing data, or erasing data at the memory devices 105 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can include a processor 107 (e.g., processing device) configured to execute instructions stored in a local memory 108 for performing the operations described herein. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code, for example. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 105 and/or the memory device 112. The memory sub-system controller 104 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 105. The memory sub-system controller 104 can further include host interface circuitry to communicate with the host system 102 via the physical host interface. The host interface circuitry can convert the commands received from the host system into command instructions to access the memory devices 105 and/or the memory device 112 as well as convert responses associated with the memory devices 105 and/or the memory device 112 into information for the host system 102.

The memory sub-system 103 can also include additional circuitry. In some embodiments, the memory sub-system 103 can include a cache (e.g., a cache memory 112) or buffer (e.g., DRAM) and address circuitry (e.g., a row decoder and a column decoder) that can receive an address from the memory sub-system controller 104 and decode the address to access the memory devices 105.

In some embodiments, the memory devices 105 include a local media controller 110 that operates in conjunction with memory sub-system controller 104 to execute operations on one or more memory cells of the memory devices 105. An external controller (e.g., memory sub-system controller 104) can externally manage the memory device 105 (e.g., perform media management operations on the memory device 105). In some embodiments, a memory device 105 is a managed memory device, which is a raw memory device combined with a local controller (e.g., local controller 110) for media management within the same memory device package. An example of a managed memory device is a managed NAND (MNAND) device.

In at least one embodiment, the interface 109 is compatible with the DDR-4 NVDIMM-P protocol and has pins that are compatible with the DDR-4 NVDIMM-P physical slot. For example, the interface 109 can include an NVDIMM-P CA physical layer (PHY), NVDIMM-P event PHY, and NVDIMM-P DQ PHY. The NVDIMM-P command/address (CA) PHY can be coupled to a command decode for handling host commands. The interface 109 can include memory (e.g., content addressable memory) for storing commands and addresses associated therewith. The interface 109 can compare the commands received from the host system 102 to determine whether there are two or more write commands to a same address of the memory device 105, among other possible memory devices.

The NVDIMM-P CA PHY can be configured to share a single alert signal for parity errors and uncorrectable ECC (UECC) errors. However, the wait times and pulse widths are different for parity errors and UECC errors on the single alert signal. In some embodiments, the NVDIMM-P CA PHY can be coupled to a parity register and an error register. The parity register can be configured to keep track of the wait time and pulse width for the single alert signal for parity errors. The error register can be configured to keep track of the wait time and pulse width for the UECC errors. A single alert generation logic can generate the alert signal with the appropriate assertion time (e.g., from the wait time) and pulse width based on the type of error (parity or UECC) using the parity register and error register. The registers can be programmed with the respective wait times and pulse widths.

The NVDIMM-P DQ PHY can be coupled to error circuitry and via the error circuitry to a write buffer for writing data to the memory sub-system 103. The error circuitry can be included in the interface 109. The error circuitry is described in more detail with respect to FIG. 2. The NVDIMM-P DQ PHY can also be coupled to a read buffer for receiving data from the memory sub-system 103.

The NVDIMM-P DQ PHY can be coupled to the command decode to provide an indication to the host that the memory sub-system 103 is ready to receive a command therefrom. In some embodiments, the command decode can provide such an indication based on an available amount of write credits. The interface 109 can have a memory dedicated to storing write credits from the cache controller 111. In at least one embodiment, each write command equates to one write credit. For each write command that the interface 109 provides to the cache controller 111, one write credit is consumed. Once the cache controller 111 has processed the write command, it can release the write credit by signaling the interface 109 to indicate that the write is complete. As a non-limiting example, the interface 109 can store 10 write credits, meaning that the interface 109 can have at most 10 outstanding write commands for the cache controller, after which the interface 109 would indicate to the host 102 that additional write commands cannot be received therefrom. Multiple outstanding (incomplete) write commands to a same address can needlessly consume write credits for the interface 109. According to various embodiments of the present disclosure, the interface 109 can identify multiple write commands to a same address and either delete the oldest commands if the commands have not yet been provided to the cache controller 111 or mark the subsequent commands with an indication that causes the cache controller to delete the preceding commands to the same address. Marking a write command can include adding metadata to the write command, such as flipping a bit in a header of the write command, which can signal the cache controller 111 that a previously received command having the same address should be dropped rather than executed. According to the present disclosure, the ability to detect multiple write commands to the same address at the interface 109 allows the cache controller 111 to more quickly release write credits to the interface 109, which beneficially allows the memory sub-system 103 to receive additional write commands from the host 102 without slowing down the command pipeline between the host 102 and the memory device 105.

Figure 2:
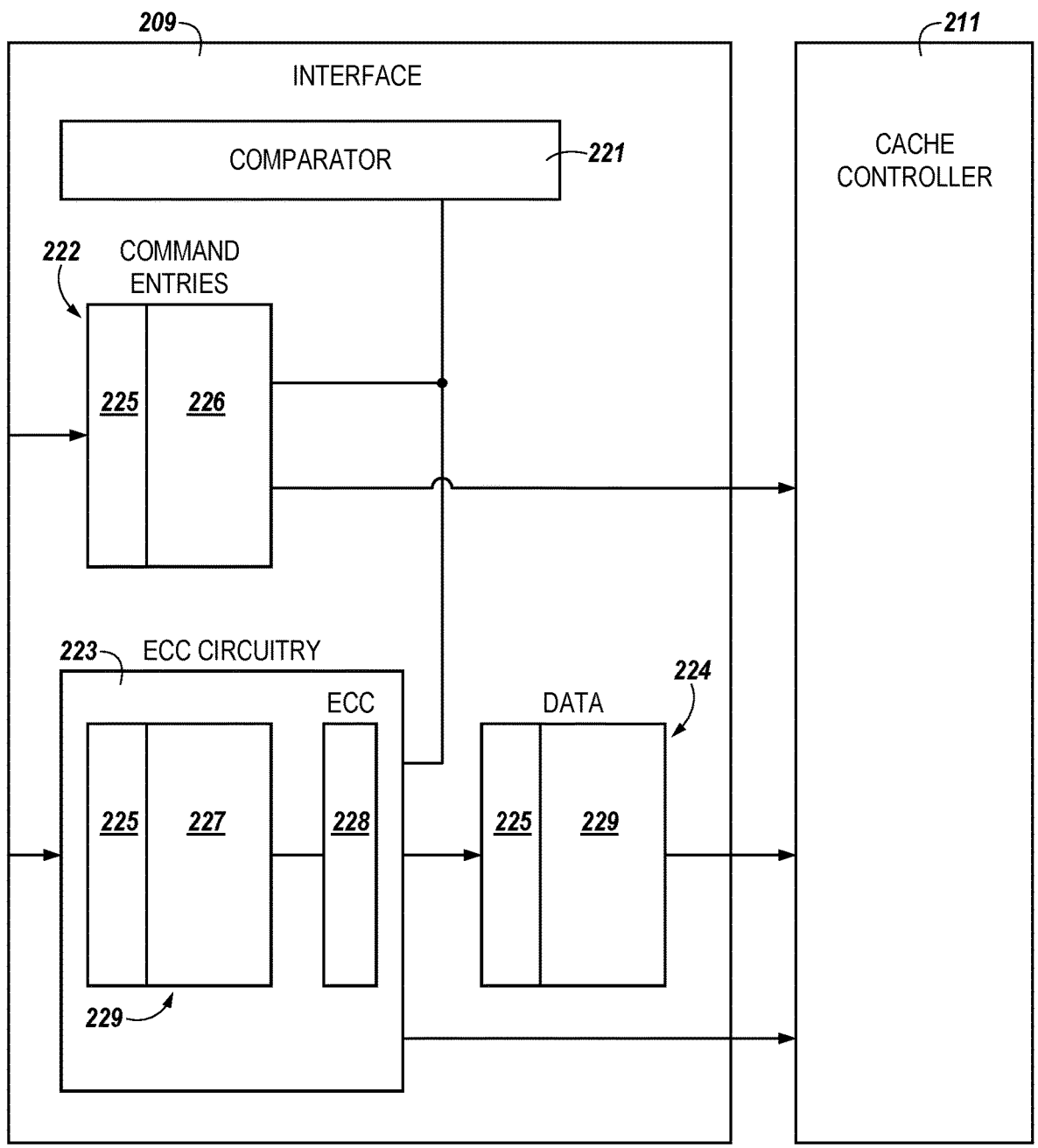
FIG. 2 illustrates an example of a computing system that includes an interface in accordance with some embodiments of the present disclosure.

Some additional detail of the interface 109 is illustrated and described with respect to FIG. 2. Ultimately, the interface 109 is coupled to the memory sub-system controller 104 (and thus to the memory device 105) and to the cache controller 111 (and thus to the cache memory 112 because the cache controller 111 is coupled to the cache memory 112). The cache controller 111 can also be coupled to the memory sub-system controller 104.

In order to provide large capacity and persistent storage, the backend of the memory sub-system 103 includes a 3D cross-point array of non-volatile memory cells as the memory device 105. However, 3D cross-point memory has much higher latency than typical DRAM. Thus, in order to narrow down the latency gap between typical DRAM and the 3D cross-point memory, the memory sub-system 103 includes a higher speed cache memory 112 between the backend storage provided by the memory device 105 and the interface 109. The cache memory 112 can include DRAM, SRAM, reduced latency DRAM third generation (RLDRAM3), or a combination thereof. RLDRAM3 is a type of DRAM with an SRAM-like interface. RLDRAM3 generally has lower latency and greater capacity than SRAM. RLDRAM3 generally has better performance than DRAM, particularly for back-to-back read and write accesses or completely random access.

The NVDIMM-P event PHY can be coupled to an event manager for receiving reports of events in the memory sub-system 103. For example, the event manager can receive a ready signal from the memory sub-system 103 (or a transfer manager associated therewith). The ready signal can indicate any response or event (e.g., urgent events, interrupts, read ready, etc.) from any source. Such responses or events can be simultaneous for different sources. The responses or events can be serialized by the event manger. The event manager can use a single response counter to keep track of the responses and events. Whenever any response is ready or event occurs, the single response counter increments by one (even for simultaneous occurrences). The single response counter can set a flag for urgent events that are pending. In response to the flag being set, once a currently occurring event or response completes, the oldest flagged urgent event can be handled. Urgent events can be given priority by operation of the single response counter.

The cache controller 111 can manage the commands, addresses, and/or data received from the host 102 (intended for the memory device 105) and store the same in the cache memory 112 before the commands are executed and/or the data is stored in the memory device 105. The associated commands and/or addresses can be stored in memory internal to the interface 109 and be operated on by a command builder and/or command manager (not specifically illustrated) before being transferred to the cache controller 111 as described herein. In some embodiments, the cache memory 112 can store data retrieved from the memory device 105 before being sent to the host 102. The cache memory 112 can be read from and written to faster than the memory device 105. As such, it may be beneficial to read and write to the cache memory 112 instead of the memory device 105 to provide for a low latency in executing write commands and/or read commands.

The interface 109 can mark and/or drop write commands corresponding to a same address. If an earlier command to the same address has not been provided to the cache controller 111, for example, if the earlier command is still in the memory of the interface 109, then the interface 109 can drop the earlier command and provide the subsequent command to the cache controller 111. If the earlier command to the same address has already been provided to the cache controller 111, then the interface 109 can mark the subsequent command to the same address and provide it to the cache controller 111. The cache controller 111 can delete (e.g., drop) the unmarked command that has a same address as the marked command provided thereto. As a result, there is only a single write command to the same address where previously there were two or more write commands to the same address. The cache controller 111 can then execute the write command by writing the data corresponding to the write command to the cache memory 112 and/or providing the write command to the memory sub-system controller 104.

Dropping and/or marking the write commands in the interface 109 can reduce the workload of the cache controller 111.

FIG. 2 illustrates an example of an interface 209 of a computing system in accordance with some embodiments of the present disclosure. The interface 209 is analogous to the interface 109 of FIG. 1. The interface can include a comparator circuitry 221, and command buffer 222 and write buffer 224. The interface can also include error circuitry 223.

As used herein, the command buffer 222 and the write buffer 224 and the error memory 229 can include data structures that are stored in memory such as SRAM or different types of memory. For example, the command buffer 222 the write buffer 224 and the error memory 229 can be implemented as registers. The command buffer 222 and the write buffer 224, and the error memory 229 can be first-in first-out (FIFO) data structures that retain an order associated with receipt of commands (e.g., read commands and/or write commands).

The interface 209 can receive commands, addresses, and/or data. The commands received by the interface 209 can be decoded by a command decode, for example. The commands received can be used to read or write data to a memory device of the memory sub-system (e.g., memory sub-system 103 of FIG. 1). For example, a command can be used to write data received by the interface 209 to an address also received by the interface 209. That address can be an address of memory cells of a memory device of a memory sub-system hosting the interface.

The data received by the interface 209 can be provided to a cache controller 211 for temporary storage in cache memory before being provided to the memory sub-system for storage in a memory device of the memory sub-system. As such, a write command to an address of the memory device can be implemented by storing data corresponding to the write command to the cache memory. When the memory sub-system is ready, the data stored by the cache memory can be provided to the memory device according to the address associated with the write command. In at least one embodiment, the host that sent the write command and associated address may be unaware that the data is temporarily stored in cache memory before being stored in the addressed location.

The interface 209 can assign write IDs 225 to the write commands that are received. The command buffer 222 can store the write IDs 225 and addresses 226 corresponding to the write commands. For example, each entry in the command buffer 222 can include a write ID and an address, where the write ID and the address correspond to the write command. The addresses 226 can be physical addresses and/or virtual addresses, among other types of memory addresses that can be used. In at least one embodiment, the command buffer 222 can store the write IDs 225 and addresses 226 until a corresponding write command has been executed by the memory sub-system associated with the relevant address. For example, the command buffer 222 can store a particular write ID 225 and address 226 after the write command and accompanying data have been provided to the cache controller 211, but before the write command and accompanying data have been provided to the memory sub-system. Such embodiments can be beneficial in allowing the interface 209 to send a drop signal to the cache controller 211 to cause the cache controller to drop a write command having a same address as another write command that is later received by the interface 209, but before the previous write command has been executed by the memory sub-system.

The comparator circuitry 221 can compare the addresses 226 to determine whether any two or more of the addresses 226 are a same address or overlapping addresses. For example, the comparator circuitry 221 can compare a first write ID having a first address with a second write ID having a second address. If the first address and the second address match, then the comparator circuitry 221 can determine that the command having the first write ID should be deleted. If the command having the first write ID has not yet been passed to the cache controller 211, then the interface 209 can delete the write command. If the command having the first write ID has been passed to the cache controller 211, then the interface 209 can send a drop signal to the cache controller 211 to cause the cache controller 211 to delete the command having the first write ID.

The write IDs can be assigned sequentially based on an order in which the write commands are received from a host. In some embodiments, responsive to determining that two commands write to a same address, the comparator circuitry 221 can mark the earlier received of the two commands (e.g., the command having a lesser write ID). The comparator circuitry 221 can cause the error circuitry 223 to mark the earlier received write command by sending a signal to the error circuitry 223 indicating the same. In such an example, the error circuitry 223 can mark the earlier received command as being erroneous without regard to performing an error check on the write command (or accompanying data) and/or without regard to whether the write command (or accompanying data) pass an error check if performed. Marking the command can include setting a bit in metadata of the write command. The cache controller 211 can be configured to read the bit from the metadata of the write command and in response to the bit being set, can delete the corresponding command. The data corresponding to the write command can also be deleted and/or not provided downstream of where the deletion occurs.

The error circuitry 223 can perform an error check 228 to detect and/or correct corruptions of data corresponding to the commands received by the interface 209. The error circuitry 223 can identify data that is free of corruptions and/or data that includes corruptions after the error check 228 has been performed. The error circuitry 223 can identify the data utilizing the error memory 229. The error memory 229 can include entries comprising the write IDs 225 and the error check results 227. Associating write IDs 225 with error check results 227 of data received by the interface 209 can allow for the association of data and write commands. For example, each entry in the error memory 229 can include a write ID corresponding to a write command and a result of the error check 228 performed on data corresponding to the write command.

The data received by the interface 209 can be stored in the write buffer 224 after the error check 228 has been performed. For example, the data can be provided from the error circuitry 223 to the write buffer 224. Each entry to the write buffer 224 can include a write ID and data corresponding to a write command. The result of the error check 228, the data 224, the write ID, and/or the addresses 226 can be provided to the cache controller 211.

The cache controller 211 can merge the commands that were identified by the interface 209 by dropping the commands marked in the error memory 229. As used herein, dropping a command or deleting a command includes refraining from executing a command. As such, the cache controller 211 can refrain from executing write commands that are marked in the error memory 229.

In various examples, the comparator circuitry 221 can mark the commands that write to a same address except for a last received command from the commands that write to the same address. For instance, if a first command and a second command are write commands for a same address and the first command was received prior to a second command, then the comparator circuitry 221 can mark the first command and not the second command in the error memory 229.

The error memory 229 can be used to simultaneously provide information regarding a result of the error check 228 and information regarding which commands should be dropped for purposes of merging write commands. The cache controller 211 may drop the marked commands without identifying whether commands are being merged or data corresponding to the commands is corrupted. Dropping the commands can include dropping addresses corresponding to the command and/or data corresponding to the command among other attributes of the commands or the commands themselves. A number of embodiments can be implemented by incorporating the comparator circuitry 221 in the interface 209 without adding additional circuitry, to drop the commands, other than in the cache controller 211.

Although not shown, the comparator circuitry 221 can be implemented outside the interface 209 and the cache controller 211. The external comparator circuitry 221 can mark the commands in the error memory 229. Marking the commands externally form the interface 209 and/or the cache controller 211 can cause the commands to be dropped by the cache controller 211.

The cache controller 211 can implement commands that are not marked. For example, the cache controller 211 can write data to the cache memory and/or can provide the data to the memory sub-system controller (e.g., memory sub-system controller 104 in FIG. 1) for writing to a memory device of the memory sub-system.

The commands, addresses, and/or data can be received through different streams. The error circuitry 223 can be configured to describe attributes of both the addresses of the commands and the data corresponding to the commands utilizing the error memory 229. The attributes can include whether multiple commands store data to a same address. The attributes can also include whether the data corresponding to write commands is corrupt. Marking the write commands can include describing attributes of the stream of commands and/or the attributes of the stream of data. The write commands can be marked as if the data corresponding to the write commands is corrupted (e.g., there are errors in the data) even if the data is not corrupted. Likewise, the write commands can be marked in the error memory 229 as if the data is corrupt even though the data may not be corrupt.

Figure 3:
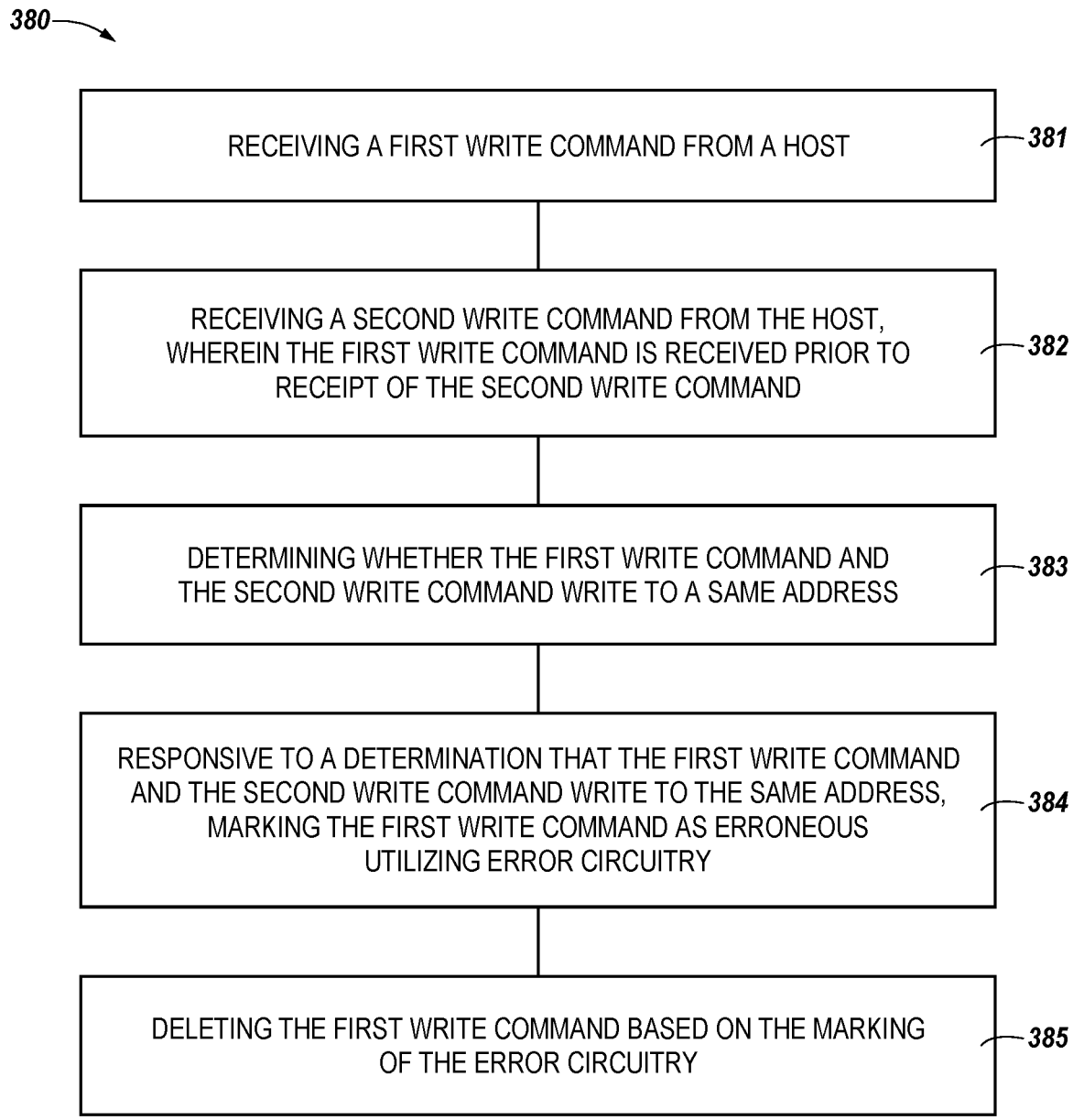
FIG. 3 is a flow diagram of an example of a method for arbitration circuitry in accordance with some embodiments of the present disclosure.

FIG. 3 is a flow diagram of an example of a method 380 corresponding to arbitration circuitry in accordance with some embodiments of the present disclosure. The method 380 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 380 is performed by the interface 109 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 381, a first write command can be received from a host. At block 382, a second write command can be received from the host. The first write command can be received prior to receipt of the second write command. At 383, it can be determined whether the first write command and the second write command write to a same address. For example, a first address of the first write command can be compared to a second address of the second write command.

At 384, responsive to a determination that the first write command and the second write command write to the same address, the first write command can be marked as erroneous utilizing error circuitry. At 385, the first write command can be deleted based on the marking of the error circuitry. A cache controller can delete the first write command even though the first write command was marked by an interface of a memory device hosting the cache controller.

The cache controller can process the second write command responsive to the second write command passing an error check performed by the error circuitry of the interface. In various examples, a determination can be made whether the second write command passes the error check prior to marking the first write command for deletion.

In various instances, marking the first write command for deletion can further entail utilizing the error circuitry to describe attributes of a stream of commands and a stream of data. A stream of commands can describe write commands received by an interface of a memory sub-system. The error circuitry can include error memory that can be used to store an indication that a write command is addressed to a same address as a different write command of the write commands received (e.g., stream of write commands). The error memory can also store an indication that data corresponding to respective ones of the write commands does not pass an error check.

In various instances marking the first write command can include marking the first write command as if there exists errors in data corresponding to the first write command. The first write command can be marked even if no errors exist in data corresponding to the first write command responsive to a determination that the first write command should be deleted. The first write command can be determined to be deleted if the first write command is addressed to a same addressed as a different write command and if the first write command was received prior to receipt of the different write command to the same address.

Figure 4:
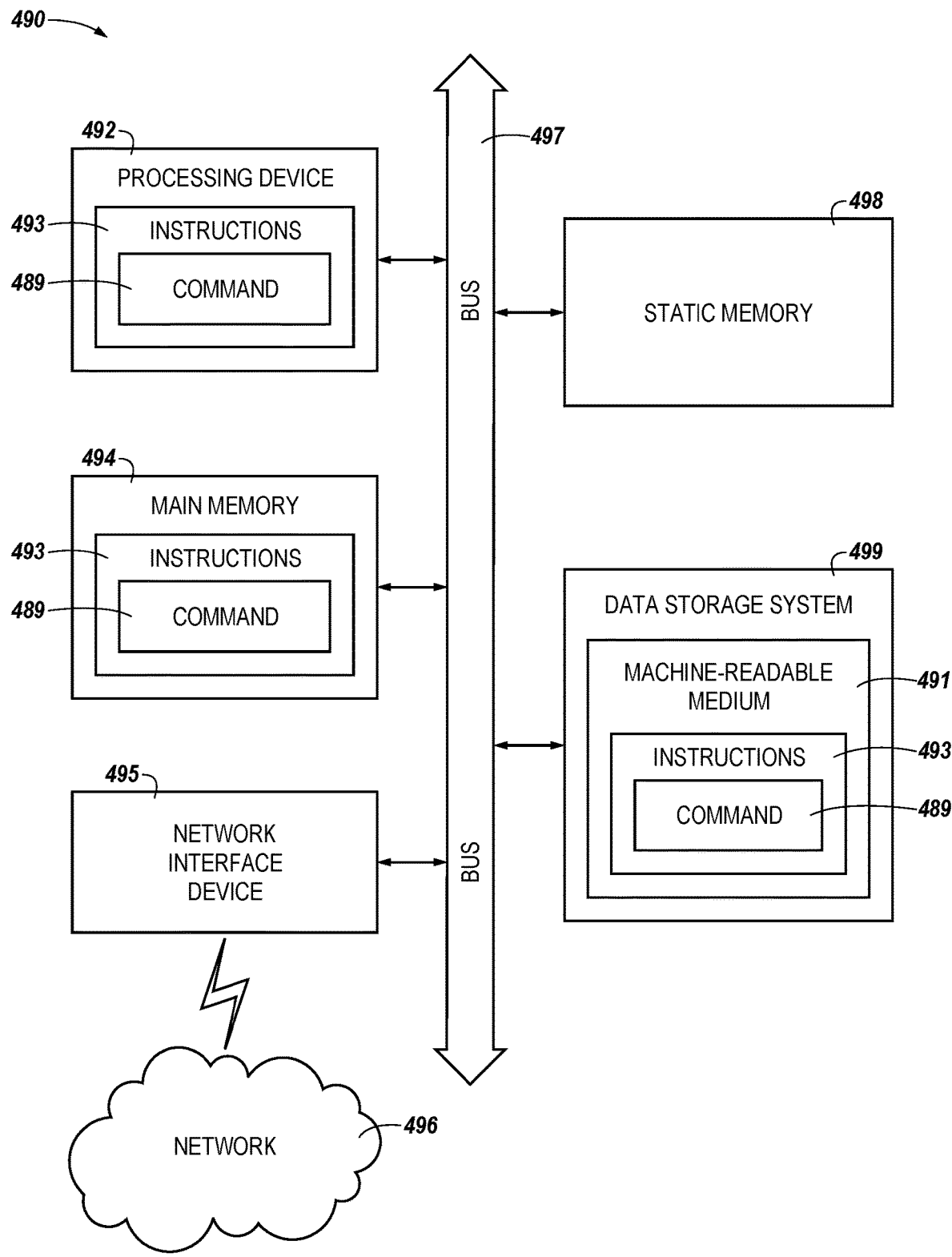
FIG. 4 is a block diagram of an example of a computer system in which embodiments of the present disclosure may operate.

FIG. 4 illustrates an example of a machine of a computer system 490 within which a set of instructions, for causing the machine to perform one or more of the methodologies discussed herein, can be executed. In some embodiments, the computer system 490 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to the interface 109 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 490 includes a processing device 492, a main memory 494 (e.g., read-only memory (ROM), flash memory, dynamic random access memory (DRAM) such as synchronous DRAM (SDRAM) or Rambus DRAM (RDRAM), etc.), a static memory 498 (e.g., flash memory, static random access memory (SRAM), etc.), and a data storage system 499, which communicate with each other via a bus 497.

The processing device 492 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 492 can also be one or more special-purpose processing devices such as an application specific integrated circuit (ASIC), a field programmable gate array (FPGA), a digital signal processor (DSP), network processor, or the like. The processing device 492 is configured to execute instructions 493 for performing the operations and steps discussed herein. The computer system 490 can further include a network interface device 495 to communicate over the network 493.

The data storage system 499 can include a machine-readable storage medium 491 (also known as a computer-readable medium) on which is stored one or more sets of instructions 493 or software embodying one or more of the methodologies or functions described herein. The instructions 493 can also reside, completely or at least partially, within the main memory 494 and/or within the processing device 492 during execution thereof by the computer system 490, the main memory 494 and the processing device 492 also constituting machine-readable storage media. The machine-readable storage medium 491, data storage system 499, and/or main memory 494 can correspond to the memory sub-system 103 of FIG. 1.

In one embodiment, the instructions 493 include instructions to implement functionality corresponding to a compute component (e.g., the interface 109 of FIG. 1). The instructions can include a command instruction 489 associated with merging write commands in an interface of a memory sub-system (e.g., interface 109 in FIG. 1). While the machine-readable storage medium 491 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device;

a processing device coupled to the memory device and configured to control cache memory for the memory device; and an interface coupled to the processing device and configured to:
   determine that a particular write command received from a host has a same address as a subsequently received write command from the host;
   delete the particular write command in response to the particular write command not having been provided to the processing device; and
   signal the processing device to delete the particular write command in response to the particular write command having been provided to the processing device.

2. The system of claim 1, wherein the interface is further configured to provide the subsequently received write command to the processing device; and
   wherein the processing device is configured to:
      execute the subsequently received write command with respect to the cache memory; and
      provide the subsequently received write command to a memory controller of the memory device.

3. The system of claim 2, wherein the processing device is configured to provide the subsequently received write command to the memory controller of the memory device via the interface.

4. The system of claim 3, wherein the interface is further configured to control timing of the provision of the subsequently received write command to the memory controller of the memory device based on an availability of the memory device to execute the subsequently received write command.

5. The system of claim 1, wherein the interface is further configured to: store, in command memory, a correlation between write commands and addresses thereof with respective identifications (IDs) of each of the write commands.

6. The system of claim 5, wherein the interface is further configured to correlate with the respective IDs with an order in which the write commands were received by the interface.

7. The system of claim 6, wherein the interface is further configured to determine that the particular write command was received prior to receipt of the subsequently received write command based on the order.

8. A method comprising:
   determining whether a first write command and a second write command, received prior to the first write command, write to a same address;
   responsive to a determination that the first write command and the second write command write to the same address, marking the first write command utilizing error circuitry; and
   deleting the first write command based on the marking of the error circuitry.

9. The method of claim 8, further comprising processing, by a processing device, the second write command responsive to the second write command passing an error check.

10. The method of claim 8, wherein marking the first write command for deletion further comprises utilizing the error circuitry to describe attributes of a stream of commands and a stream of data.

11. The method of claim 10, wherein the stream of commands includes the first and the second write commands and the stream of data includes data corresponding to the first write command and data corresponding to the second write command.

12. The method of claim 8, wherein marking the first write command further comprises marking the first write command as if there exists errors in data corresponding to the first write command.

13. A system, comprising:
   a memory device;
   a processing device coupled to the memory device;
   comparator circuitry coupled to the processing device and configured to:
      access a first write command, a second write command, and a third write command received from a host;
      determine that the first write command, the second write command, and the third write command write data to a same address of the memory device; and
      mark the first write command and the second write command utilizing error circuitry responsive to determining that the first write command, the second write command, and the third write command write data to the same address of the memory device and that the third write command is received after the first write command and second write command;
   wherein the processing device is configured to delete the first write command and the second write command in response to the first write command and the second write command being marked.

14. The system of claim 13, wherein the system further comprises an interface comprising the comparator circuitry, wherein the interface is configured to provide the first write command and the second write command to the processing device.

15. The system of claim 14, wherein the interface is further configured to provide the third write command to the processing device for execution.

16. The system of claim 14, wherein the interface further comprises:
   the error circuitry; and
   error memory wherein the error circuitry is further configured to store information in the error memory that identifies whether data corresponding to the first write command and the second write command passed an error correction check.

17. The system of claim 16, wherein the interface is further configured to assign a first write ID to the first write command and a second write ID to the second write command.

18. The system of claim 17, wherein the interface is further configured to store the first write ID and the second write ID in the error memory with the information stored by the error circuitry.

19. The system of claim 18, wherein the interface is further configured to store an erroneous indication corresponding to the first write ID and the second write ID in the error memory with the information stored by the error circuitry to mark the first write command and the second write command.

20. The system of claim 17, wherein the interface is further configured to release the first write ID and the second write ID responsive to a deletion of the first write command and the second write command by the processing device.

* * * * *